US008596105B2

United States Patent
Ito et al.

(10) Patent No.: US 8,596,105 B2
(45) Date of Patent: Dec. 3, 2013

(54) PUNCH

(75) Inventors: Atsushi Ito, Owariasahi (JP); Hikaru Nakamoto, Inuyama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 555 days.

(21) Appl. No.: 12/605,243

(22) Filed: Oct. 23, 2009

(65) Prior Publication Data
US 2010/0037672 A1    Feb. 18, 2010

Related U.S. Application Data

(62) Division of application No. 11/390,352, filed on Mar. 28, 2006, now abandoned.

(30) Foreign Application Priority Data

Mar. 29, 2005 (JP) ................. 2005-094691

(51) Int. Cl.
  *B21D 28/24*    (2006.01)
  *B21D 28/28*    (2006.01)
  *B21D 37/18*    (2006.01)
  *B26F 1/14*    (2006.01)

(52) U.S. Cl.
  USPC .................. 72/327; 72/325; 72/335; 29/432; 29/432.2; 83/686

(58) Field of Classification Search
  USPC ........... 72/325–327, 333, 335; 29/432, 432.1, 29/432.2; 83/686
  See application file for complete search history.

(56) References Cited

U.S. PATENT DOCUMENTS

| | | | |
|---|---|---|---|
| 2,234,849 A | 3/1941 | Wales | |
| 2,369,896 A | 2/1945 | Harris et al. | |
| 2,797,595 A | 7/1957 | Smith et al. | |
| 3,461,195 A | 8/1969 | Sebastiani | |

(Continued)

FOREIGN PATENT DOCUMENTS

| CN | 1079328 A | 2/2002 |
|---|---|---|
| EP | 0858893 A2 | 8/1998 |

(Continued)

OTHER PUBLICATIONS

Japan Patent Office, Notice of Reasons for Rejection for counterpart Patent Application No. JP 2005-094691, dispatch date, May 7, 2008 (previously submitted in U.S. Appl. No. 11/390,352).

(Continued)

*Primary Examiner* — Clark F. Dexter
(74) *Attorney, Agent, or Firm* — Baker Botts L.L.P.

(57) ABSTRACT

A punch for use in molding a workpiece with lubricating oil interposed between the punch and the workpiece includes a straight portion and a diameter-increasing portion. The straight portion includes an end face and a side face. The straight portion extends in an axial direction. The end surface extends in a radial direction perpendicular to the axial direction. The side surface is connected to the end surface. The diameter-increasing portion is connected to the straight portion. The diameter-increasing portion includes a width in the radial direction, which is identical to that of the straight portion, at a junction between the straight portion and the diameter-increasing portion. The width of the diameter-increasing portion in the radial direction increases with distance from the straight portion. At least one of the end surface and the side surface of the straight portion is formed with a pit.

13 Claims, 6 Drawing Sheets

(56) References Cited

U.S. PATENT DOCUMENTS

| | | |
|---|---|---|
| 3,478,629 A | 11/1969 | Ek et al. |
| 5,054,308 A | 10/1991 | Asai et al. |
| 5,239,751 A | 8/1993 | Kanamaru et al. |
| 5,697,154 A | 12/1997 | Ogihara |
| 5,752,424 A | 5/1998 | Rosene et al. |
| 6,968,616 B2 | 11/2005 | Nakamura et al. |
| 2003/0122900 A1 | 7/2003 | Nakamura et al. |

FOREIGN PATENT DOCUMENTS

| | | |
|---|---|---|
| JP | S57-042913 A | 3/1982 |
| JP | S57-095305 A | 6/1982 |
| JP | S57-208250 A | 12/1982 |
| JP | H03-099743 A | 4/1991 |
| JP | H03-268808 A | 11/1991 |
| JP | H04-261861 A | 9/1992 |
| JP | H06-210370 A | 8/1994 |
| JP | H10-109125 A | 4/1998 |
| JP | 2001-279466 A | 10/2001 |
| JP | 2002-113529 A | 4/2002 |
| JP | 2002-321026 A | 11/2002 |
| JP | 2003-010928 A | 1/2003 |

OTHER PUBLICATIONS

European Patent Office, European Search Report in Communication pursuant to Article 94(3) EPC in counterpart Patent Application No. EP 06 00 5497, mailed May 20, 2009 (previously submitted in U.S. Appl. No. 11/390,352).

State Intellectual Property Office of the People'S Republic of China, Office Action in counterpart Patent Application No. CN 200610068057, mailed Aug. 17, 2008 (previously submitted in U.S. Appl. No. 11/390,352).

European Patent Office, European Search Report in counterpart Patent Application No. EP 06 00 5497, mailed May 10, 2006 (previously submitted in U.S. Appl. No. 11/390,352).

PUNCH

CROSS-REFERENCE TO RELATED APPLICATIONS

This is a divisional application of U.S. patent application Ser. No. 11/390,352 filed Mar. 28, 2006, now abandoned, which claims the benefit of priority from Japanese Patent Application No. 2005-94691 filed on Mar. 29, 2005, the disclosures of which are incorporated herein by reference.

BACKGROUND OF THE INVENTION

1. Field of the Invention

The invention relates to a punch for use in molding a workpiece.

2. Description of the Related Art

Various molds and molding methods using the molds have been proposed in order to mold a workpiece. For example, JP S57-208250 A has disclosed a method of producing an inkjet nozzle from an orifice back sheet and an orifice sheet and a punch used in the method. This method of producing the inkjet nozzle is carried out as follows. A tip end portion of a conical punch is pressed against a sheet placed on a die to thereby form concave portions shaped in accordance with the shape of the tip end of the punch in the sheet. Then, convex portions formed on a surface of the sheet opposite to the surface against which the punch is pressed are ground by a lapping machine to thereby form fine holes in the sheet. In this manner, an orifice back sheet is produced.

SUMMARY OF THE INVENTION

In the technique disclosed in JP Sho.57-208250 A, there is however a problem that the punch, especially a portion of the punch being in contact with the sheet, is broken or worn away so severely that the life of the punch is short. Particularly, when fine holes in a range of from the order of microns to the order of tens of microns such as nozzle holes of an inkjet nozzle are formed by molding, the life of the punch becomes very short due to breaking, frictional wear, etc. because the tip end portion of the punch must be as narrow as each fine hole. Therefore, a method for molding a workpiece while supplying lubricant to a die inclusive of the punch has been used in recent years. There is however a limit to elongate the life of the die because the surface of the die is so smooth that the lubricant flows out immediately even if the lubricant is supplied in this manner. Therefore, a method for always supplying lubricant may be conceived but there is another problem that the method is uneconomic to bring increase in production cost.

The invention provides a punch in which lubricant retention capacity is made high enough to suppress the punch from being broken or worn away.

According to one aspect of the invention, a punch for use in molding a workpiece with lubricating oil interposed between the punch and the workpiece includes a straight portion at an end of the punch and a diameter-increasing portion. The straight portion extends in an axial direction. The straight portion includes an end face at an end thereof and a side face. The end surface extends in a radial direction perpendicular to the axial direction. The side surface is connected to the end surface. The diameter-increasing portion is connected to the straight portion. The diameter-increasing portion includes a width in the radial direction, which is identical to that of the straight portion, at a junction between the straight portion and the diameter-increasing portion. The width of the diameter-increasing portion in the radial direction increases with distance from the straight portion. At least one of the end surface and the side surface of the straight portion is formed with a pit. According to this configuration, when the end of the straight portion is pressed against the workpiece to perform molding, a part of lubricant supplied to the straight portion or to the workpiece remains in the pit to thereby keep the lubricity between the straight portion and the workpiece high. For this reason, the punch is prevented from being broken or worn away, so that the life of the punch is elongated. According to another aspect of the invention, a punch is provided for use in molding a workpiece with lubricating oil interposed between the punch and the workpiece. The punch includes a diameter-increasing portion at an end of the punch. The diameter-increasing portion includes an end surface extending in a radial direction perpendicular to an axial direction of the punch. The width of the diameter-increasing portion increases with distance from the end surface. The end surface of the diameter-increasing portion is formed with a pit.

According to this configuration, when the end of the diameter-increasing portion is pressed against the workpiece to perform molding, a part of the lubricant supplied to the diameter-increasing portion or to the workpiece remains in the pit to thereby keep the lubricity between the diameter-increasing portion and the workpiece high. For this reason, the punch is prevented from being broken or worn away, so that the life of the punch is elongated.

DETAILED DESCRIPTION OF EMBODIMENTS OF THE INVENTION

Embodiments of the invention will be described below with reference to the drawings. Although these embodiments are examples in each of which the invention is applied to a punch used for molding a nozzle plate of an inkjet head, the invention can be also applied to molding for another molded article.

Figure 1:
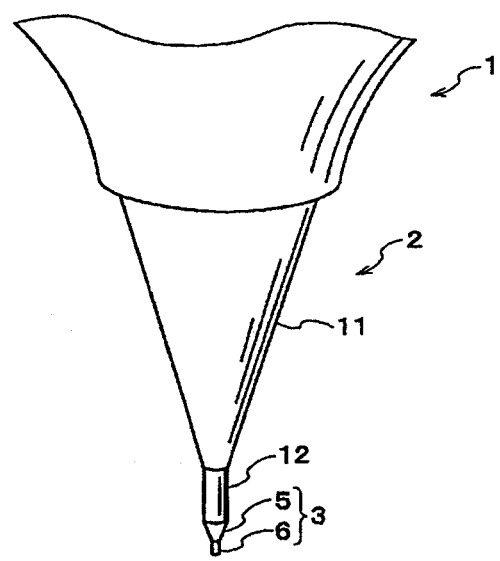
FIG. 1 is a perspective view showing parts of a press die to which a punch according to a first embodiment of the invention is applied.

FIG. 1 is a perspective view showing parts of a press die using a punch according to a first embodiment of the invention. As shown in FIG. 1, the press die 1 includes a body portion 2, and a punch 3 formed at a lower end portion of the body portion 2 so as to be used for molding. The punch 3 of the press die 1 is used for molding a substrate 21 (see FIGS. 5A to 5C) of a nozzle plate. The body portion 2 has a conical portion 11 tapered off downwards, and a columnar portion 12 extending downwards from a lower end of the conical portion 11.

Figure 2:
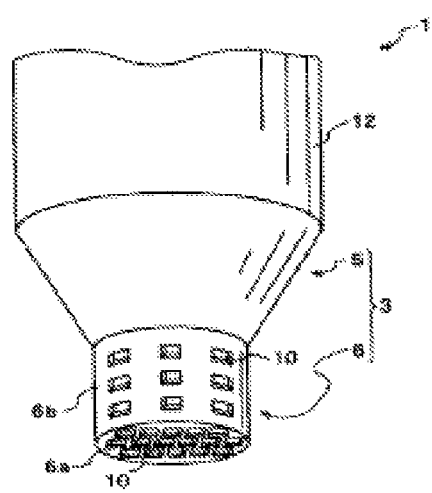
FIG. 2 is an enlarged perspective view of a punch depicted in FIG. 1.

FIG. 2 is an enlarged perspective view of the punch 3 depicted in FIG. 1. As shown in FIG. 2, the punch 3, which is the end portion of the press die 1, has a truncated cone-shaped taper portion (diameter-increasing portion) 5 connected to a lower end of the columnar portion 12, and a columnar straight portion 6 connected to a lower end of the taper portion 5. The punch 3 is integrated with the body portion 2.

The taper portion 5 is formed so that the diameter in the radial direction perpendicular to the axial direction of the punch 3 decreases gradually and linearly as approaching from the lower end of the columnar portion 12 of the body portion 2 toward the upper end of the straight portion 6 of the punch 3. The straight portion 6 has a circular end surface 6a, which is in parallel to a direction perpendicular to the axial direction of the punch 3. The straight portion 6 is shaped like a column so that a discharge port 27 of a nozzle 26 of a nozzle plate 25 can be formed. The diameter and shape of the lower end of the taper portion 5 are identical to those of the upper end of the straight portion 6.

Figure 3:
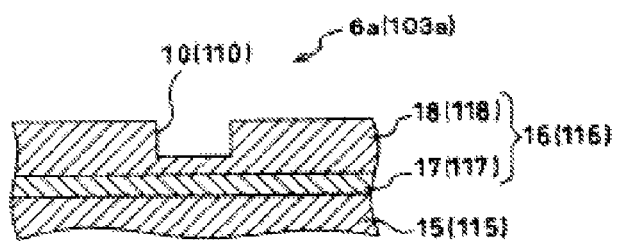
FIG. 3 is an enlarged sectional view showing the structure of the punch depicted in FIG. 2.

FIG. 3 is an enlarged sectional view showing the structure of the straight portion 6 of the punch depicted in FIG. 2. The taper portion 5 has the same structure as that of the straight portion 6 shown in FIG. 3 except that no pit 10 is formed in the taper portion 5. As shown in FIG. 3, the straight portion 6 has a die member 15 integrated with the body portion 2, and a hard coating film 16 harder than the die member 15. The die member 15 functions as a base material of the press die 1. The die member 15 is formed in such a manner that a die material, which is made of hard metal (cemented carbide) with a Vickers hardness (HV) of 1,500, is mechanically processed into the shape of the die member 15. The hard metal of the die member 15 is an alloy obtained by sintering a mixture of tungsten carbide, vanadium carbide, titanium carbide, tantalum carbide, chromium carbide and metallic cobalt prepared in predetermined proportions. The mean particle size of carbide in the alloy is equal to or larger than 0.05 µm and less than 0.3 µm. For example, if the particle size of carbide in the hard metal is less than 0.05 µm, the surface area of each powder particle becomes so large that there arises a problem that carbonization of each powder particle is accelerated or the particles are apt to be aggregated. If the particle size of carbide is equal to or larger than 0.3 µm, carbide particles on the surface of the punch 3 may drop out. There arises a problem that relatively large concave portions remain after the dropout to thereby cause cracking with the concave portions serving as start points of the cracking and cause lowering of strength due to propagation of the cracking. Accordingly, when the die member 15 is made of hard metal containing carbide with a mean particle size, which is equal to or larger than 0.05 µm and less than 0.3 µm as described above, the strength of the press die 1 is improved remarkably. For this reason, transverse rupture strength of the punch 3 is improved so that the punch 3 can be suppressed from being broken when a fine hole is formed by the punch 3.

The hard coating film 16 has a tungsten (W) coating film 17 formed on the surface of the die member 15, and a diamond-like carbon (DLC) coating film 18 formed on the surface of the W coating film 17. The W coating film 17 is formed as an intermediate layer with a thickness of about 0.5 µm to prevent the DLC coating film 18 from being peeled off from the surface of the die member 15. This is because bonding force between carbon contained in the DLC coating film 18 and the W coating film 17 is large and bonding force between the W coating film 17 and the die member 15 made of hard metal is large, so that the DLC coating film 18 can be hardly peeled off from the die member 15 in comparison with the case where the DLC coating film 18 is directly formed on the die member 15 made of hard metal.

The DLC coating film 18 formed as a surface layer of the hard coating film 16 is lower in friction coefficient and harder than the die member 15 of hard metal. The DLC coating film 18 with a thickness of about 1.5 µm is formed on the surface of the W coating film 17. The strength of the DLC coating film 18 can be adjusted on the basis of the hydrogen content of the DLC coating film 18 at the time of forming the DLC coating film 18. The DLC coating film 18 can be formed as a hard coating film with the Vickers hardness (HV) of from several hundreds to about 8,000 close to the HV of diamond. In this embodiment, the DLC coating film 18 with HV of 3,600 harder than the W coating film (HV 430) 17 and the die member (HV 1,500) 15 is formed on the W coating film 17. The DLC coating film 18 is a coating film very excellent in abrasion resistance and slidability because the friction coefficient of the DLC coating film 18 is about 0.1 or smaller with respect to SUS 430. For this reason, the life of the punch 3 can be elongated. The thicknesses of the W coating film 17 and the DLC coating film 18 have been shown by way of example. The thicknesses may be smaller or larger than the aforementioned values but the thicknesses may be preferably decided so that durability of the die member 15 is not damaged by a heat-affected layer, which is generated in the surface of the base material affected by heat generated by a focused ion beam method at the time of forming the pits 10 as will be described later. Although it is preferable from the viewpoint of good abrasion resistance, slidability and longevity as described above that the DLC coating film 18 is harder than the die member 15, this hardness relation is not always required and it is also an important requirement that the DLC coating film 18 is lower in friction coefficient than the die member 15. That is, reduction in friction coefficient of the DLC coating film 18, as well as increase in hardness of the DLC coating film 18, effectively contributes to longevity.

As shown in FIGS. 2 and 3, concave pits 10, which are opened outwards so that lubricant can be temporarily reserved in the pits 10, are formed in the surface of the straight portion 6 of the punch 3, that is, in the surface of the DLC coating film 18. For example, an opening of each pit 10 is shaped like a square about 3 µm on a side. The pits 10 are formed in the end surface 6a and outer circumferential side surface 6b of the straight portion 6 but no pit 10 is formed in the outer circumferential side surface of the taper portion 5. Because no pit 10 is formed in the taper portion 5 as described above, traces of the pits 10 can be prevented from remaining on the molded surface of the substrate 21 when the nozzle plate 25 is produced by the press die 1 as will be described later. As shown in FIG. 3, the pits 10 are formed so as not to pass through the DLC coating film 18. Because the pits 10 do not reach the W coating film 17 in the depth direction as described above, the bottom surface of each pit 10 is relatively far from the surface of the die member 15. For this reason, heat generated at the time of forming the pits 10 by the focused ion beam method as will be described later can be prevented from being transmitted to the die member 15. Accordingly, metallic cobalt contained in hard metal of the die member 15 is prevented from being molten by heat. Thus no heat-affected layer is formed as a modified layer, and durability of the die member 15 can be prevented from being deteriorated.

The pits 10 may be formed so that a total area of the bottom surfaces of the pits 10 account for 20%-80% of the surface area of the straight portion 6 (i.e. a sum of the area of the end surface 6a and the area of the outer circumferential side surface 6b). If a ratio of the total area of the bottom surfaces of the pits 10 is smaller than 20%, lubricant retention capacity can be hardly improved. If a ration of the total area of the pits 10 is larger than 80%, both lubricant retention capacity and durability of a region where the pits 10 are not formed can be hardly improved because the pits 10 are formed in large part of the straight portion 6. The pits 10 are formed at higher distribution density in the end surface 6a of the straight portion 6 than in the outer circumferential side surface 6b because the end surface 6a needs high slidability because the end surface 6a first comes into contact with the substrate 21 at the time of molding the substrate 21. Accordingly, lubricant retention capacity can be improved while the strength of the punch 3 can be prevented from being lowered. Therefore, slidability, durability and abrasion resistance of the punch 3 can be improved.

Figure 4A:
FIGS. 4A to 4D are sectional views successively showing steps of producing the press die.
Figure 4B:
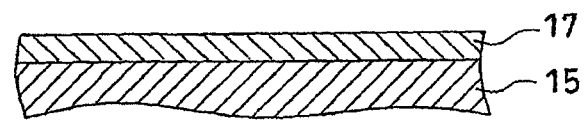
Figure 4C:
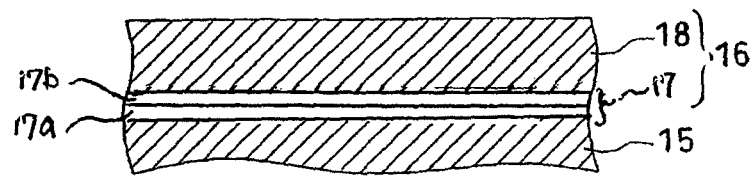

Next, a method of producing the press die 1 will be described with reference to FIGS. 4A to 4D. FIGS. 4A to 4D are sectional views successively showing steps of producing the press die. First, a die material made of hard metal is cut into the shape of the body portion 2 and the shape of the punch 3 to thereby prepare the die member 15. On this occasion, the outer diameter of the die member 15 is determined in consideration of the thicknesses of the W coating film 17 and the DLC coating film 18, which will be formed later, so that the resultant punch 3 can be fitted to the inner diameter of the discharge port 27 of the nozzle 26 of the nozzle plate 25. Then, as shown in FIGS. 4B and 4C, the W coating film 17 and the DLC coating film 18 are formed continuously on the surface of the die member 15 shown in FIG. 4A by an unbalanced magnetron (UBM) sputtering method.

In the case of forming of the W coating film 17 and the DLC coating film 18, sputtering is performed using tungsten (W) as a target to form the W coating film 17 with a predetermined thickness. Thereafter, sputtering is performed using graphite (carbon) as a target while sputtering is performed using W concurrently. On this occasion, the process is shifted so that the rate of sputtering of W decreases gradually and relatively the rate of sputtering of graphite increases gradually as the process advances. That is, a gradient composition layer in which the composition ratio of tungsten to carbon changes continuously is interposed. Finally, sputtering of graphite only is performed. As a result, the DLC coating film 18 with a predetermined thickness is formed on the surface of the W coating film 17. Because the gradient composition layer is interposed in the boundary region between the W coating film 17 and the DLC coating film 18 as described above, contact between the two coating films 17 and 18 is improved to relax residual stress based on difference in expansion coefficient. Incidentally, FIG. 4C schematically shows the resulting film structure obtained in this manner. The W coating layer 17 includes the W layer 17a and the gradient composition layer 17b. It is noted that detailed structure of the W coating layer 17 is only shown in FIG. 4C but omitted in the other drawings. Also, the W layer 17a and the gradient composition layer 17b may be referred to as the W coating layer 17 collectively for the convenience of the description.

Figure 4D:
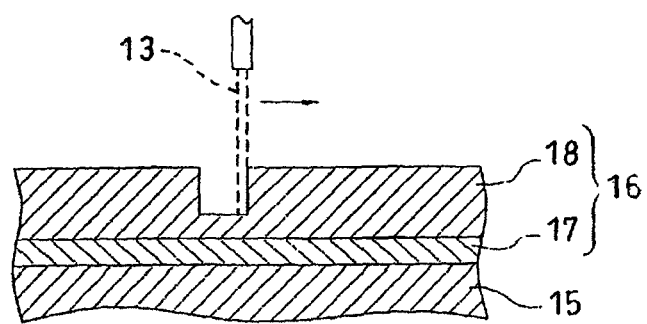

Then, as shown in FIG. 4D, pits 10 of a fine depth are formed by the focused ion beam method in the end surface 6a and the outer circumferential side surface 6b of the straight portion 6 of the punch 3 with respective predetermined distribution densities. Specifically, in this case, liquid gallium is used as an ion source, the acceleration voltage and the beam current are set to be 30 KV and 1.3 nA, respectively. The position where each pit 10 will be formed is scanned for about one minute with a focused ion beam 13 having a beam diameter focused into about 10 nm to thereby form the pit 10 in the DLC coating film 18. This pit forming process is repeated so that pits 10 are formed in the end surface 6a and the outer circumferential side surface 6b of the straight portion 6. In this manner, production of the press die 1 having the punch 3 with the pits 10 is completed. In this embodiment, the depth of each pit 10 formed by the focused ion beam is limited so that thin part of the DLC coating film 18 remains under the bottom portion of the pit 10. Accordingly, characteristic of the intermediate layer (W film 17a) and the gradient composition layer 17b can be prevented from being deteriorated during the pit forming process, so that the strength of the punch 3, especially the strength of the straight portion 6, can be structurally prevented from being lowered.

Next, a method of press-molding the substrate 21 of stainless steel having a thickness of from about 30 μm to about 100 μm by using the press die 1 to produce the nozzle plate 25 will be described. The nozzle plate 25 is provided on the outermost surface of an inkjet head. Nozzles 26 for ejecting ink pressurized by a piezoelectric element or the like are formed in the nozzle plate 25.

Figure 5A:
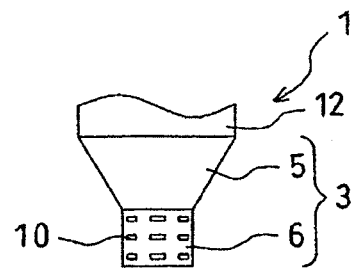
FIGS. 5A to 5C are sectional views successively showing steps of producing a nozzle plate.
Figure 5B:
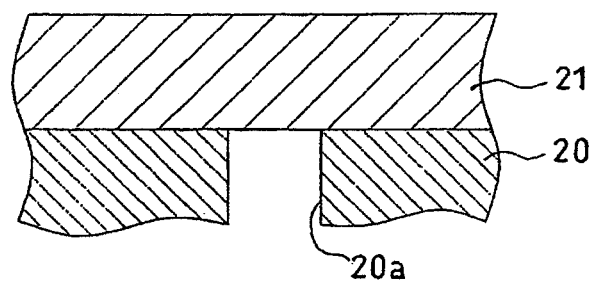
Figure 5C:
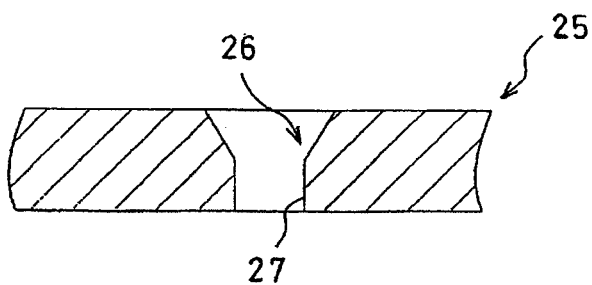

FIGS. 5A to 5C are sectional views successively showing steps of producing the nozzle plate. For molding, the substrate 21 is first placed on a die base 20 having a die hole 20a as shown in FIG. 5A and is fixed and retained thereto. Lubricating oil functioning as lubricant is applied or sprayed on the whole surface of the straight portion 6 of the punch 3 of the press die 1 so that the lubricating oil is reserved in the pits 10. On this occasion, lubricant retention capacity of the press die 1 is so high that lubricating oil is not applied or sprayed every time a single press molding cycle is completed. That is, lubricating oil can be applied or sprayed intermittently whenever a number of press molding cycles are completed. For example, in the case where lubricant G-6220FS made by NIHON KOHSAKUYU CO., LTD. is used so that about 3,600 press molding cycles are performed for an hour, the lubricant may be supplied once an hour or once per 3,000 cycles.

Then, as shown in FIG. 5B, while the press die 1 is moved down toward the substrate 21, the substrate 21 is pressed against the punch 3 with such a stroke quantity that the punch 3 does not pierce the substrate 21. In this manner, the substrate 21 is press-molded. On this occasion, the DLC coating film 18 having a low friction coefficient, for example, of 0.1 or lower with respect to SUS430 is formed on the surface layer of each of the straight portion 6 and the taper portion 5 of the punch 3. Moreover, the lubricating oil is reserved in the pits 10 of the straight portion 6. Accordingly, friction force acting on the punch 3 from the substrate 21 becomes remarkably small. This is because the independent pits 10 are formed so as to be uniformly distributed in the end surface 6a of the straight portion 6 of the punch 3 so that higher lubricity can be kept in the end surface 6a where the contact pressure between the punch 3 and the substrate 21 is maximized. Also, lubricating oil in the pits 10 formed in the end surface 6a goes round between the substrate 21 and the outer circumferential side surface 6b because the end surface 6a comes into contact with the substrate 21, so that friction force between the outer circumferential side surface 6b and the substrate 21 is reduced. In addition, the independent pits 10 are formed so as to be uniformly distributed in the outer circumferential side surface 6b of the straight portion 6. Therefore, friction force between the outer circumferential side surface 6b and the substrate 21 is reduced more greatly. As a result, slidability of the punch 3 is kept so high that the life of the punch 3 is elongated. Hereafter, this molding process is repeated number of times equal to the number of nozzles 26 while the substrate 21 is moved at intervals of a nozzle pitch or at intervals of a nozzle row pitch. In this manner, the substrate 21 is press-molded. Then, as shown in FIG. 5C, after the press molding, the lower surface portion (lower side from the broken line shown in FIG. 5B) of the substrate 21 inclusive of the convex portion 19 etc. protruding toward a side of the substrate 21 opposite to the press die 1 is ground by a grinding machine or the like to thereby open the ejection port 27 of each nozzle 26. In this manner, the nozzle plate 25 is completed.

Since the pits 10 are formed in the surface of the straight portion 6 of the punch 3 of the press die 1 as described above, the punch 3 can hold lubricating oil. When the straight portion 6 of the punch 3 is pressed against the substrate 21 to perform press molding, lubricating oil is little by little supplied to the friction surface between the punch 3 and the substrate 21 so that the low friction state can be kept. For this reason, the lubricity between the straight portion 6 and the substrate 21 is kept high. As a result, the punch 3 is prevented from being broken and worn away, so that the life of the press die 1 is elongated while the life of the punch 3 is elongated. Moreover, because the pits 10 are formed in the end surface 6a and the outer circumferential side surface 6b of the straight portion 6, the lubricating-oil retained state can be kept for a long time.

When the substrate 21 is placed on the die base while inclined slightly, pressing may be performed in the condition that the press die 1 is inclined with respect to the substrate 21. Even in this case, transverse friction acting between the end surface 6a of the straight portion 6 and the surface of the substrate 21 is reduced by lubricating oil retained in the pits 10 formed in the punch 3. Therefore, the punch 3 can be prevented from being broken due to bending. When the punch 3 is pulled out from the substrate 21 after press molding, friction force acting between the side surface of each of the taper portion 5 and the straight portion 6 and the surface of each nozzle 26 can be reduced. Therefore, tensile stress acting on the punch 3 can be reduced to prevent the punch 3 from being broken or worn away.

Figure 6:
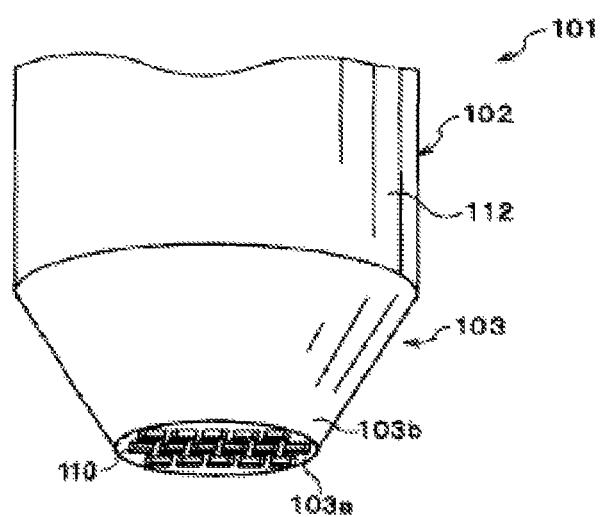
FIG. 6 is an enlarged perspective view showing a press die to which a punch according to a second embodiment of the invention is applied.

Next, a punch according to a second embodiment will be described with reference to FIG. 6. FIG. 6 is an enlarged perspective view of a press die to which a punch according to a second embodiment is applied. As shown in FIG. 6, the press die 101 according to this embodiment has a body portion 102 and a punch 103. The body portion 102 is provided with a columnar portion 112 extending downwards. The punch 103 is formed at a lower end portion of the body portion 102 so as to be used in molding. The punch 103 of the press die 101 is used in molding a substrate 121 into a nozzle plate 125 in the same manner as in the first embodiment. The press die 101 of the second embodiment is substantially the same as the press die 1 except that the straight portion 6 of the punch 3 is not formed in the press die 101.

As shown in FIG. 6, the punch 103 (functioning as diameter-increasing portion) is shaped like such a taper that the diameter of the punch 103 perpendicular to the axial direction of the punch 103 decreases gradually and linearly as approaching from the lower end of the columnar portion 112 toward the end of the punch 103. The punch 103 has a circular end surface 103a, which is in parallel to a direction perpendicular to the axial direction of the punch 103. Pits 110 identical to the pits 10 are formed so as to be uniformly distributed in the end surface 103a. On the other hand, no pit 110 is formed in an outer circumferential side surface 103b of the punch 103. Because the pits 110 are not formed in the outer circumferential side surface 103b formed as an inclined surface as described above, traces of the pits 110 do not remain on the molded surface of the substrate 121 when each nozzle 126 is formed in the substrate 121 by the press die 101.

Although the structure of the punch 103 will be described below, description will be made with reference to FIG. 3 while the reference numerals for the second embodiment are shown in parentheses because the punch 103 is substantially the same as the punch 3 according to the first embodiment. Like the punch 3 according to the first embodiment, the punch 103 has a die member 115 integrated with the body portion 102, and a hard coating film 116 harder than the die member 115. In this embodiment, the die member 115 is formed in such a manner that a die material made of chromium-molybdenum steel (SCM415) with HV 200 is mechanically processed into the shape of the die member 115 and then carburized and hardened. The hard coating film 116 has a chromium (Cr) coating film 117 formed on the surface of the die member 115, and a DLC coating film 118 formed on the surface of the Cr coating film 117. The Cr coating film 117 is formed to have a thickness of about 0.5 μm in the same manner as the W coating film 17. The DLC coating film 118 formed as a surface layer of the hard coating film 116 is a coating film with HV 800 harder than the die member 115 made of chromium-molybdenum steel. The DLC coating film 118 with a thickness of about 1.5 μm is formed on the surface of the Cr coating film 117. That is, the punch 103 is made of materials different from the materials of the die member 15 and the hard coating film 16 in the first embodiment but the punch 103 has substantially the same effect. Incidentally, with respect to the property of the hard coating film 116, the hard coating film 116 is not necessary harder than the die member 115 as in the case of the punch 3 according to the first embodiment. The hard coating film 116 may be lower in friction coefficient than the die member 115, for example, the friction coefficient of the hard coating film 116 may be 0.1 or lower with respect to SUS430.

Next, a method of producing the press die 101 will be described below. The press die 101 can be produced substantially in the same manner as the press die 1 according to the first embodiment. That is, a die material made of chromium-molybdenum steel is mechanically processed into the shape of the body portion 102 and the shape of the punch 103 and then carburized and hardened to thereby prepare the die member 115. On this occasion, the outer diameter of the die member 115 is determined in consideration of the thicknesses of the Cr coating film 117 and the DLC coating film 118, which will be formed later, so that the resultant punch 103 can be fitted to the inner diameter of each nozzle. Then, the Cr coating film 117 and the DLC coating film 118 are formed continuously on the surface of the die member 115 by an unbalanced magnetron (UBM) sputtering method.

In the case of forming the Cr coating film 117 and the DLC coating film 118, after sputtering is performed using Cr as a target to form the Cr coating film 117 having a predetermined thickness, sputtering is performed using graphite (carbon) as a target while sputtering is performed using Cr concurrently. On this occasion, the process is shifted so that the rate of sputtering of Cr decreases gradually and the rate of sputtering of graphite increases gradually as the process advances. The DLC coating film 118 is formed on the surface of the Cr coating film 117. Also in this embodiment, a gradient composition layer including Cr and carbon is interposed between the Cr coating film 117 and the DLC coating film 118 as described above but not shown in FIG. 3.

Pits 110 having such a fine depth that the pits 110 do not pass through the DLC coating film 118 and that a heat-affected layer modified by heat is not generated in the surface of the die member 115 are formed in the end surface 103a of the punch 103 by the focused ion beam method in the same manner as in the first embodiment. The pits 10 are formed in the end face 103a at a predetermined distribution density. In this manner, production of the press die 101 having the punch 103 formed with the pits 110 is completed.

Next, a method of press-molding the substrate 121 of stainless steel having a thickness of from about 30 μm to about 100 μm by using the press die 101 to produce the nozzle plate 125 will be described. The nozzle plate 125 is the same as the nozzle plate 25.

Figure 7A:
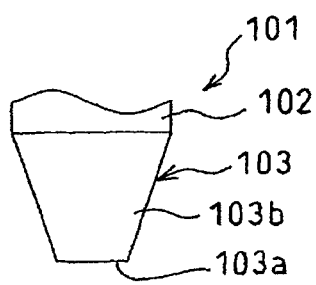
FIGS. 7A to 7C are sectional views successively showing steps of producing a nozzle plate.
Figure 7B:
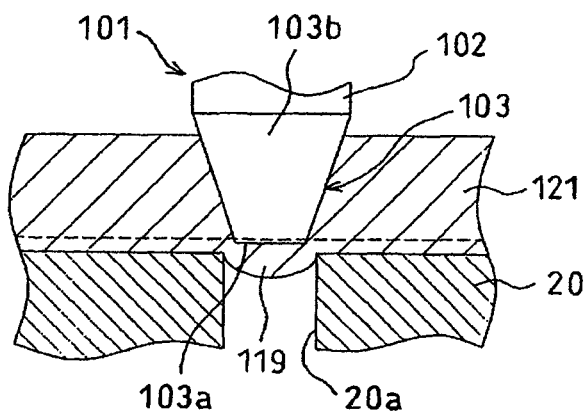
Figure 7C:
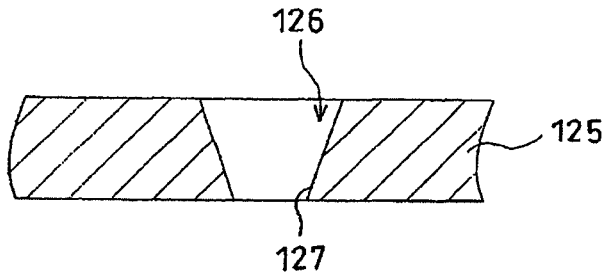

FIGS. 7A to 7C are sectional views successively showing steps of producing the nozzle plate. For molding, the substrate 121 is first placed on a die base 20 having a die hole 20a as shown in FIG. 7A and is fixed and retained thereto. Lubricating oil functioning as lubricant is applied or sprayed on the whole surface of the punch 103 of the press die 101 so that the lubricating oil is reserved in the pits 10 formed in the end surface 103a.

Then, as shown in FIG. 7B, while the press die 101 is moved down toward the substrate 121, the substrate 121 is pressed against the punch 103 with such a stroke quantity that the punch 103 does not pass through the substrate 121. In this manner, the substrate 121 is press-molded. On this occasion, the lubricating oil is reserved in the pits 110 of the punch 103. Therefore, friction force acting on the punch 103 from the substrate 121 becomes remarkably small. That is, because the independent pits 110 are formed so as to be uniformly distributed in the end surface 103a of the punch 103, higher lubricity can be kept in the end surface 103a where the contact pressure between the punch 103 and the substrate 121 is maximized. Accordingly, friction force generated in the end surface 103a can be reduced. In addition, because the lubricating oil reserved in the pits 110 goes round to the outer circumferential side surface 103b due to contact between the punch 103 and the substrate 121, friction force between the outer circumferential side surface 103b and the substrate 121 can be also reduced. Hereafter, this molding process is repeated number of times equal to the number of nozzles 126 while the substrate 121 is moved at intervals of a nozzle pitch or at intervals of a nozzle row pitch. In this manner, the substrate 121 is press-molded. Then, as shown in FIG. 7C, after the press molding, the lower surface portion (lower side from the broken line shown in FIG. 7B) of the substrate 121 inclusive of the convex portion 119 etc. protruding toward a side of the substrate 121 opposite to the press die 101 is ground by a grinding machine or the like to thereby open the discharge port 127 of each nozzle 126. In this manner, the nozzle plate 125 is completed.

Since the pits 110 are formed in the end surface 103a of the punch 103 of the press die 101 as described above, the punch 103 can hold lubricating oil. With this configuration, when the punch 103 is pressed against the substrate 121 to perform press molding, the lubricity between the punch 103 and the substrate 121 is kept high. As a result, friction force generated when the punch 103 is pressed against the substrate 121 and when the punch 103 is pulled out from the substrate 121 can be reduced so that the punch 103 is prevented from being broken and worn away. Accordingly, the life of the press die 101 is elongated while the life of the punch 103 is elongated. Moreover, because the punch 103 according to the second embodiment is shaped like a taper, there is little place of stress concentration compared with the punch 3 according to the first embodiment. For this reason, the life of the punch 103 is elongated more greatly.

Although the embodiments of the invention have been described above, the invention is not limited to the embodiments. Various changes may be made without departing from the scope of claims. For example, the pits 10, 110 have such a depth that the pits 10, 110 does not pass through the DLC coating film 18, 118 and does not reach the W coating film 17, the Cr coating film 117. Alternatively, the pits 10, 110 may have such a depth that the pits 10, 110 pass through the DLC coating film 18, 118 and reaches the W coating film 17, the Cr coating film 117 and the die member 15, 115. For example, when the thickness of the oil film can be known from the viscosity of the lubricant and the surface roughness of the punch, it is preferable that each pit has a depth in a range of from about 0.1 times to about 5 times as much as the thickness of the oil film. When the depth of each pit is not smaller than 0.1 times as much as the thickness of the oil film, lubricant retention capacity can be improved. Also, when the depth of each pit is not larger than 5 times as much as the thickness of the oil film, supply characteristic of the lubricant reserved in the pits can be improved. Also, only one pit 10, 110 may be formed. The punch may have a taper portion equivalent to the taper portion 5, a straight portion equivalent to the straight portion 6, and a curved surface portion smoothly connecting the taper portion and the straight portion to each other. The punch may have a curved surface portion (diameter-increasing portion) in place of the taper portion 5 so that the curved surface portion has a diameter tapered off toward the straight portion 6 and an outer circumferential side surface provided as a smooth curved surface. In these cases, the pits are preferably formed only in the straight portion. According to this configuration, the same effect as in the first embodiment can be achieved. The punch may have only a curved surface portion (diameter-increasing portion), which has a diameter tapered off toward its end surface and has an outer circumferential side surface provided as a smooth curved surface. Also in this case, the pits may be formed only in the end surface. According to this configuration, the same effect as in the second embodiment can be achieved. Although the first embodiment has been described on the case where the pits 10 are formed both in the end surface 6a of the straight portion 6 and in the outer circumferential side surface 6b of the straight portion 6, the pits 10 may be formed in either surface. In this case, if the pits 10 are formed in the end surface 6a, friction force between the substrate and the punch can be further reduced than the case where the pits 10 are formed in the outer circumferential side surface 6b.

Although the embodiments have been described on the case where lubricating oil is supplied to the punch 3, 103 before the punch 3, 103 is pressed against the substrate 21, 121 to perform press molding, lubricating oil may be applied or sprayed on the surface of the substrate 21, 121 before the punch 3, 103 is pressed against the substrate 21, 121 to perform press molding. In this case, when the punch 3, 103 is pressed against the substrate 21, 121, the lubricating oil supplied to the substrate 21, 121 is put in the pits 10, 110 so that the lubricity between the substrate 21, 121 and the punch 3, 103 is kept high. Although the pits are formed by a focused ion beam method, the pits may be formed by laser etching using a femtosecond laser, an excimer laser, an ultraviolet laser or the like. When the opening area of each pit is large, the pits may be formed by etching such as plasma etching.

Although the embodiments have been described on the case where the hard coating film 16, 116 is formed in the press die 1, 101, the hard coating film 16, 116 is not essential and may be eliminated in accordance with the shape of the die and the metal material of the die member. When the hard coating film 16, 116 is eliminated as described above, the pits may be directly formed in the surface of the die member having the straight portion in its end or directly formed in the end surface of the die member having the taper portion in its end side.

Specifically, the die member 15 according to the first embodiment is made of hard metal containing carbide with a mean particle size, which is equal to or larger than 0.05 μm and less than 0.3 μm. The ground surface (the surface) is excellent, and cracking serving as a start point of rupture hardly occurs. Accordingly, the hard coating film 16 may not be formed. In this case, the pits may be formed in the surface of the straight portion 6 of the die member 15.

In the embodiments, the DLC coating film 18, 118 is formed as a surface layer of the press die 1, 101. Alternatively, a hard coating film such as a CrN coating film may be formed in place of the DLC coating film so long as the hard coating film is harder than the die member to make contribution to abrasion resistance and reduction in friction force.

The embodiments exemplarily show that the die member 15, 115 is made of the alloy (hard metal) obtained by sintering the mixture of tungsten carbide, vanadium carbide, titanium carbide, tantalum carbide, chromium carbide and metallic cobalt prepared in the predetermined proportions. Alternatively, the die member 15, 115 may be made of another hard material such as high speed metal.

The embodiments have been described on the case where a liquid lubricant is used as the lubricant. Alternatively, lubricant of nanolevel particles may be used. In this case, particles of silicon oxide (with a diameter of from about 10 nm about 40 nm), titanium oxide (with a diameter of about 20 nm), aluminum oxide (with a diameter of about 10 nm) or the like can be used.

The embodiments have been described on the case where the invention is applied to a punch of a press die for forming nozzles of a nozzle plate of an inkjet head. Alternatively, the invention may be applied to other various press dies such as a press die for lead frame of semiconductor and a press die for molding parts of a sawing machine or a car.

What is claimed is:

1. A punch for use in molding a workpiece with lubricating oil interposed between the punch and the workpiece, the punch comprising:
   a straight portion at an end of the punch, the straight portion extending in an axial direction, the straight portion comprising:
      an end surface at an end thereof, the end surface extending in a radial direction perpendicular to the axial direction; and
      a side surface connected to the end surface;
   a base material;
   a coating film formed on the base material on at least one of the end surface and the side surface of the straight portion, the coating film having hardness greater than that of the base material; and
   a diameter-increasing portion connected to the straight portion, the diameter-increasing portion comprising a width in the radial direction, which is identical to a corresponding width of the straight portion at a junction between the straight portion and the diameter-increasing portion, the width of the diameter-increasing portion in the radial direction increasing with distance from the straight portion,
   wherein the coating film is formed with a plurality of concave pits configured to retain lubricating oil, each of the pits including an opening formed therein configured to receive such lubricating oil.

2. The punch according to claim 1, wherein the diameter-increasing portion further comprises a side surface, which is not formed with any pit.

3. The punch according to claim 1, wherein the plurality of concave pits comprises pits formed in the coating film disposed on the side surface of the straight portion.

4. The punch according to claim 3, wherein a ratio of a total of areas of bottom surfaces of the pits to a surface area of the straight portion is in a range of 20% to 80%.

5. The punch according to claim 1, wherein the plurality of concave pits comprises pits formed in the coating film disposed on the end surface of the straight portion.

6. The punch according to claim 1, wherein:
   the end surface of the straight portion is formed with pits of the plurality of concave pits,
   the side surface of the straight portion is formed with pits of the plurality of concave pits, and
   a distribution density of pits formed in the end surface of the straight portion is higher than a distribution density of the pits formed in the side surface of the straight portion.

7. The punch according to claim 1, wherein the coating film has a friction coefficient lower than that of the base material.

8. The punch according to claim 7, wherein the coating film comprises a surface layer comprising a DLC coating film.

9. The punch according to claim 8, wherein the coating film further comprises an intermediate layer, which comprises one of a chromium coating film and a tungsten coating film, between the DLC coating film and the base material.

10. The punch according to claim 9, wherein the intermediate layer comprises:
    a metal layer consisting essentially of one of chromium and tungsten, the metal layer formed on the base material; and
    a gradient composition layer of chromium and carbon or of tungsten and carbon formed on the metal layer.

11. The punch according to claim 8, wherein each pit of the plurality of concave pits has a depth so as not to pass through the DLC coating film.

12. The punch according to claim 1, wherein:
    the base material comprises hard metal comprising carbide containing at least one selected from the group consisting of tungsten carbide, vanadium carbide, titanium carbide and tantalum carbide, and
    a mean particle size of the carbide of the hard metal is equal to or larger than 0.05 μm and is less than 0.3 μm.

13. The punch according to claim 1, wherein the plurality of concave pits are intermittently spaced and formed in a plurality of pit rows extending around an outer diameter of the side surface, each of the concave pits forming each of the respective plurality of pit rows are aligned on a common pit row plane such that each pit row plane is parallel to every other pit row plane of the plurality of pit rows.

* * * * *